US012728734B2

(12) United States Patent
Gallagher et al.

(10) Patent No.: US 12,728,734 B2
(45) Date of Patent: Sep. 8, 2026

(54) ADAPTIVELY CONTROLLABLE VEHICLE INVERTER SYSTEM AND METHOD

(71) Applicant: EATON INTELLIGENT POWER LTD., Dublin (IE)

(72) Inventors: Colm Gallagher, London (GB); Julia O'Connell, Dublin (IE); Niall Cahill, Dublin (IE)

(73) Assignee: EATON INTELLIGENT POWER LTD., Dublin (IE)

( * ) Notice: Subject to any disclaimer, the term of this patent is extended or adjusted under 35 U.S.C. 154(b) by 221 days.

(21) Appl. No.: 18/291,468

(22) PCT Filed: Jul. 28, 2021

(86) PCT No.: PCT/EP2021/071100

§ 371 (c)(1),
(2) Date: Jan. 23, 2024

(87) PCT Pub. No.: WO2023/006191

PCT Pub. Date: Feb. 2, 2023

(65) Prior Publication Data

US 2025/0100394 A1 Mar. 27, 2025

(51) Int. Cl.

| | |
|---|---|
| ***B60L 50/10*** | (2019.01) |
| ***B60L 15/20*** | (2006.01) |
| ***B60L 50/14*** | (2019.01) |
| ***B60L 50/51*** | (2019.01) |

(52) U.S. Cl.

CPC ............... *B60L 50/51* (2019.02); *B60L 15/20* (2013.01); *B60L 50/14* (2019.02); *B60L 2210/40* (2013.01)

(58) Field of Classification Search

CPC .. B60L 15/20; B60L 2210/40; B60L 2260/26; B60L 50/14; B60L 50/51; B60L 7/14; Y02T 10/72

USPC ........................................................... 701/22

See application file for complete search history.

(56) References Cited

U.S. PATENT DOCUMENTS 10,286,892 B1 * 5/2019 Johri ......................... H02P 6/06
11,708,060 B2 * 7/2023 Yard .................... B60W 10/119 701/22
11,753,022 B2 * 9/2023 Lin ......................... B60L 15/20 701/22

(Continued)

FOREIGN PATENT DOCUMENTS

AU 2013291659 A1 * 2/2015 .......... B60L 15/2054
EP 3168122 A1 * 5/2017 .......... B62J 45/4152
WO 2020/143495 A1 7/2020

*Primary Examiner* — Jonathan L Sample

(74) *Attorney, Agent, or Firm* — LEYDIG, VOIT & MAYER, LTD.

(57) ABSTRACT

There is provided a method and a system to adaptively control a vehicle inverter system that is operable to power a vehicle powertrain, wherein the vehicle powertrain comprises a plurality of operating modes. The method and system comprises adaptively controlling the AC power output of the vehicle inverter system to vary the AC power output of the vehicle inverter system for the vehicle powertrain according to each operating mode of the vehicle powertrain. The method and system further comprises identifying the operating mode of the vehicle powertrain in real-time and adaptively controlling the AC power output of the vehicle inverter system according to the identified real-time operating mode of the vehicle powertrain.

11 Claims, 7 Drawing Sheets

(56) References Cited

U.S. PATENT DOCUMENTS

| | | | | | |
|---|---|---|---|---|---|
| 2005/0256631 | A1* | 11/2005 | Cawthorne | B60K 6/445 | 701/99 |
| 2008/0265812 | A1* | 10/2008 | Adra | B60L 50/11 | 318/375 |
| 2012/0056567 | A1* | 3/2012 | Savagian | B60L 50/40 | 318/400.3 |
| 2014/0121867 | A1* | 5/2014 | Tamai | B60W 10/08 | 180/65.265 |
| 2015/0258950 | A1* | 9/2015 | Namuduri | B60W 10/26 | 180/65.285 |
| 2016/0023555 | A1* | 1/2016 | Namuduri | B60W 10/08 | 903/906 |
| 2016/0052505 | A1* | 2/2016 | Zhou | B60L 58/12 | 903/930 |
| 2020/0161997 | A1* | 5/2020 | Saitoh | H02P 6/10 | |
| 2023/0226925 | A1* | 7/2023 | Porter | B60L 15/2018 | 701/22 |

* cited by examiner

400

ADAPTIVELY CONTROLLABLE VEHICLE INVERTER SYSTEM AND METHOD

FIELD OF INVENTION

The present invention relates to vehicle inverter systems and methods for electrically powered vehicles.

BACKGROUND

In electrically powered vehicles, a vehicle inverter system converts a direct current (DC) from an electrical power source to an alternating current (AC). The inverter supplies the AC to power a vehicle powertrain. In turn, the vehicle powertrain drives the electrically powered vehicle. For example, when electrical power is required to drive the wheels of a vehicle, a vehicle inverter system may convert DC from a vehicle battery pack to supply AC to a traction motor of the vehicle powertrain so as to rotate the wheels.

The motion of the vehicle (speed, acceleration, deceleration, cruising etc.) is governed by a plurality of operating modes of the vehicle powertrain, where each operating mode produces a different type of vehicle motion.

Typically, a vehicle inverter system follows a single control method to provide a non-adapting AC power output to the vehicle powertrain in all scenarios and regardless of the real-time operating mode of the vehicle powertrain. Due to the single control method, the vehicle powertrain operates with a non-adapting torque for all operating modes. As a result, the efficiency of a conventional vehicle inverter is restricted, the lifespan of the power source is limited. Further, as the conventional vehicle inverter operates with a non-adapting torque, full torque is available at all times regardless of the operating mode of the vehicle, and this therefore leads to an inefficient system.

The present invention seeks to overcome or at least mitigate the problems of conventional vehicle inverters.

SUMMARY

An aspect of the present disclosure relates to a method to adaptively control a vehicle inverter system that is operable to power a vehicle powertrain of an electrically powered vehicle. The vehicle powertrain has a plurality of operating modes. The powertrain controls the motion of the electric vehicle and each operating mode generates a different motion of the electrically powered vehicle.

The method comprises adaptively controlling the operation of the vehicle inverter system according to each operating mode of the vehicle powertrain.

The method may comprise adaptively controlling the operation of the vehicle inverter system to vary the AC power output of the vehicle inverter system for the vehicle powertrain according to each operating mode of the vehicle.

The method may comprise adaptively controlling the AC power output of the vehicle inverter system according to a predetermined torque of the vehicle powertrain associated with each respective operating mode of the vehicle powertrain. As such, the method may comprise adaptively controlling the AC power output of the vehicle inverter system for the vehicle powertrain such that the vehicle powertrain operates with a desired predetermined torque during an operating mode of the vehicle powertrain.

It is known that the optimum torque of the powertrain varies according to the operating mode vehicle powertrain. Therefore, preferably, the method may comprise adaptively controlling the AC power output of the vehicle inverter system, according to an optimum torque of the vehicle powertrain associated with each respective operating mode of the vehicle powertrain. Hence, the method may comprise adaptively controlling the AC power output of the vehicle inverter system for the vehicle powertrain such that the vehicle powertrain operates with an optimum torque during an operating mode of the vehicle.

By adapting the AC power output of the vehicle inverter system such that the vehicle powertrain operates with a desired predetermined torque or optimum torque, the efficiencies of the power source and/or vehicle inverter system are thereby enhanced, and losses are minimised. The performance of the vehicle powertrain, and in turn the electrically powered vehicle, is improved.

The method may comprise adaptively controlling the AC power output of the vehicle inverter system by a pre-defined control strategy associated with an operating mode of the vehicle powertrain.

The method may comprise adaptively controlling the AC power output of the vehicle inverter system by a pre-defined control strategy associated with a predetermined vehicle powertrain torque for the operating mode of the vehicle powertrain. By way of example, the pre-defined control strategy may comprise a field orientated control strategy associated with a first operating mode of the vehicle powertrain, and/or a direct torque control strategy associated with a second operating mode of the vehicle powertrain and/or a model predictive control strategy associated with a third operating mode of the vehicle powertrain.

The method may comprise identifying a real-time operating mode of the vehicle powertrain; and adaptively controlling the AC power output of the vehicle inverter system according to the identified real-time operating mode of the vehicle powertrain.

The method may comprise identifying the real-time operating mode of the vehicle powertrain from vehicle inverter system power data.

By adaptively controlling the operation of the vehicle inverter whereby the vehicle inverter identifies the operating mode of the vehicle powertrain from inverter power data, the adaptive control of the vehicle inverter is a closed loop adaptive control process. No data external to the vehicle inverter and no external control method steps are required.

The method of identifying the real-time operating mode of the vehicle powertrain may comprise monitoring for real-time power data of the vehicle inverter while the vehicle powertrain performs the real-time operating mode during operation; determining the real-time operating mode of the vehicle powertrain by comparatively analysing the real-time power data of the vehicle inverter with respect to a classifying model, where the classifying model classifies power data with respect to operating modes.

Monitoring real-time power data of the vehicle inverter system may comprise monitoring real-time DC input power data and AC output power data in each phase.

Once the real-time operating mode of the vehicle powertrain is identified, the method may comprise adaptively controlling the AC power output of the vehicle inverter system according to the real-time operating mode. Preferably, adaptively controlling the AC power output of the vehicle inverter system to power the vehicle powertrain the optimum torque associated with the identified real-time operating mode of the vehicle powertrain.

An aspect of the present disclosure relates to a system to adaptively control a vehicle inverter system that is operable to power a vehicle powertrain, where the vehicle powertrain has a plurality of operating modes.

The system may comprise a controller comprising a pre-defined vehicle inverter system control strategy for each of the operating modes of the vehicle powertrain. Each control strategy controls the AC output of the vehicle inverter, and defines a pre-defined AC output for each operating mode of the vehicle powertrain. The controller may be configured to identify a real-time operating mode of the vehicle powertrain, wherein the real-time operating mode is one of the plurality of operating modes of the plurality of operating modes; and to adaptively control the AC power output of the vehicle inverter system for the vehicle powertrain using the pre-defined control strategy associated with the real-time operating mode of the vehicle powertrain.

Given that the vehicle powertrain has an optimum torque according to each operating mode of the vehicle powertrain, the controller may be configured to adaptively control the AC power output of the vehicle inverter system using the pre-defined control strategy associated with the real-time operating mode of the vehicle powertrain such that the vehicle powertrain operates with the predetermined torque according to the real-time operating mode of the vehicle powertrain.

The system may comprise a monitor configured to gather real-time power data of the vehicle inverter system as the vehicle powertrain operates in the real-time operating mode and a classifying model configured to model power data of the vehicle inverter system in relation to the plurality of operating modes of the vehicle powertrain. As such the controller may be configured to comparatively analyse the gathered real-time power date of the vehicle inverter system with respect to the classifying model to identify the real-time operating mode of the vehicle powertrain.

The monitor may be configured to monitor real-time DC input power data and real-time AC output power data in each phase of the vehicle inverter system. For example, the monitor may be configured to measure real-time DC input current and DC input voltage; and real-time AC output current and AC output voltage, at each phase.

The classifying model may comprise a predetermined classifying model and/or a real-time classifying model.

An aspect of the present disclosure relates to a method of modelling a classifying model to classify the power data of a vehicle inverter system with respect to operating modes of a vehicle powertrain.

The classifying model may be modelled offline whilst the vehicle is not in operation, in a test mode or prior to installing the vehicle inverter system and/or vehicle powertrain. Alternatively, the classifying model may be modelled online whilst the vehicle is in operation and the vehicle powertrain is operating the vehicle in a known operating mode.

In an example of an offline modelling method, the method may comprise the steps of: gathering operational power data of a vehicle inverter system as a vehicle powertrain is operating in each different known operating modes; splitting the gathered power data into a training data set and a testing data set; applying a k-means clustering technique to the training data to generate a plurality of operating mode classifying models; testing the plurality of operating mode classifying models using the testing data set; and selecting an optimal operating mode classifier model.

The step of gathering operational power data may comprise gathering DC input and AC output data of a vehicle inverter system.

The step of gathering of the operational power data may comprise performing a hardware-in-loop (HIL) process.

The splitting of the power data may comprise splitting the power data into training and testing data sets using a defined split ratio. For example, the splitting of the power data may comprise splitting the power data into training and testing data sets by a 4:1 ratio split.

The testing of the plurality of operating mode classifying models may comprise assessing each operating mode classifying model based on a corresponding optimisation score.

The selecting of the optimal operating mode classifying model may comprise selecting the tested model with the highest F1 score as the optimal classifying model. The optimal operating mode classifying model may be stored in a database of the vehicle inverter system.

In an example of an online modelling method, the method may comprise the steps of controlling the power output of the vehicle inverter system using a pre-defined control strategy; gathering real time operational power data of the vehicle inverter system as the vehicle powertrain is operating in a known operating mode of the plurality of operating modes; splitting the gathered power data into a training data set and a testing data set; applying a k-means clustering technique to the training data to generate a plurality of operating mode classifying models relating to the known operating mode of the plurality of operating modes; testing the plurality of operating mode classifying models using the testing data set; and selecting an optimal operating mode classifying model for the known operating mode of the plurality of operating modes of the vehicle powertrain.

The gathering operational power data may comprise gathering DC input and AC output data of a vehicle inverter system.

The splitting of the power data may comprise splitting the power data into training and testing data sets using a defined split ratio. For example, the splitting of the power data comprises: splitting the power data into training and testing data sets by a 4:1 ratio split.

The testing of the plurality of operating mode classifying models may comprise assessing each operating mode classifying model based on a corresponding optimisation score.

The selecting of the optimal operating mode classifying model may comprise selecting the tested model with the highest F1 score as the optimal classifying model.

The method may comprise, for each operating mode of the plurality of operating modes: controlling the power output of the vehicle inverter system using a pre-defined control strategy; gathering real time operational power data of the vehicle inverter system as the vehicle powertrain is operating in each operating mode of the plurality of operating modes; splitting the gathered power data into a training data set and a testing data set; applying a k-means clustering technique to the training data to generate a plurality of operating mode classifying models relating to each operating mode of the plurality of operating modes; testing the plurality of operating mode classifying models using the testing data set; selecting an optimal operating mode classifying model for each operating mode of the plurality of operating modes of the vehicle powertrain; collating the optimal operating mode classifying model for each operating mode to form a cumulative optimal operating mode classifying model for the plurality of operating modes of the vehicle powertrain.

The cumulative optimal operating mode classifying model may be stored in a database of the vehicle inverter system.

An aspect of the disclosure may relate to an offline modelling system to construct an offline classifying model. The system may comprise a monitor configured to gather operational power data of a vehicle inverter system while a vehicle powertrain is operating in different known operating modes; a splitter configured to split the gathered power data into a training data set and a testing data set; a processor configured to: apply a k-means clustering technique to the training data to generate a plurality of operating mode classifying models; to test the plurality of operating mode classifying models using the testing data set; and to select an optimal operating mode classifier model.

An aspect of the disclosure may relate to an online modelling system to construct an online classifying model. The system may comprise a controller configured to control the power output of the vehicle inverter system using a pre-defined control strategy; a monitor configured to gather real time operational power data of the vehicle inverter system as the vehicle powertrain is operating in a known operating mode of the plurality of operating modes; a splitter configured to split the gathered power data into a training data set and a testing data set; a processor configured to: apply a k-means clustering technique to the training data to generate a plurality of operating mode classifying models relating to the known operating mode of the plurality of operating modes; to test the plurality of operating mode classifying models using the testing data set; and to select an optimal operating mode classifying model for the known operating mode of the plurality of operating modes of the vehicle powertrain.

For each operating mode of the plurality of operating modes the system may comprise: a controller configured to control the power output of the vehicle inverter system using a pre-defined control strategy; a monitor configured to gather real time operational power data of the vehicle inverter system as the vehicle powertrain is operating in each operating mode of the plurality of operating modes; a splitter configured to split the gathered power data into a training data set and a testing data set; a processor configured to: apply a k-means clustering technique to the training data to generate a plurality of operating mode classifying models relating to each operating mode of the plurality of operating modes; to test the plurality of operating mode classifying models using the testing data set; to select an optimal operating mode classifying model for each operating mode of the plurality of operating modes of the vehicle powertrain; to collate the optimal operating mode classifying model for each operating mode to form a cumulative optimal operating mode classifying model for the plurality of operating modes of the vehicle powertrain.

BRIEF DESCRIPTION OF THE DRAWINGS

For a better understanding of the present disclosure and to show how it may be carried into effect, reference will now be made, by way of example only, to the accompanying drawings in which.

DETAILED DESCRIPTION

Figure 1:
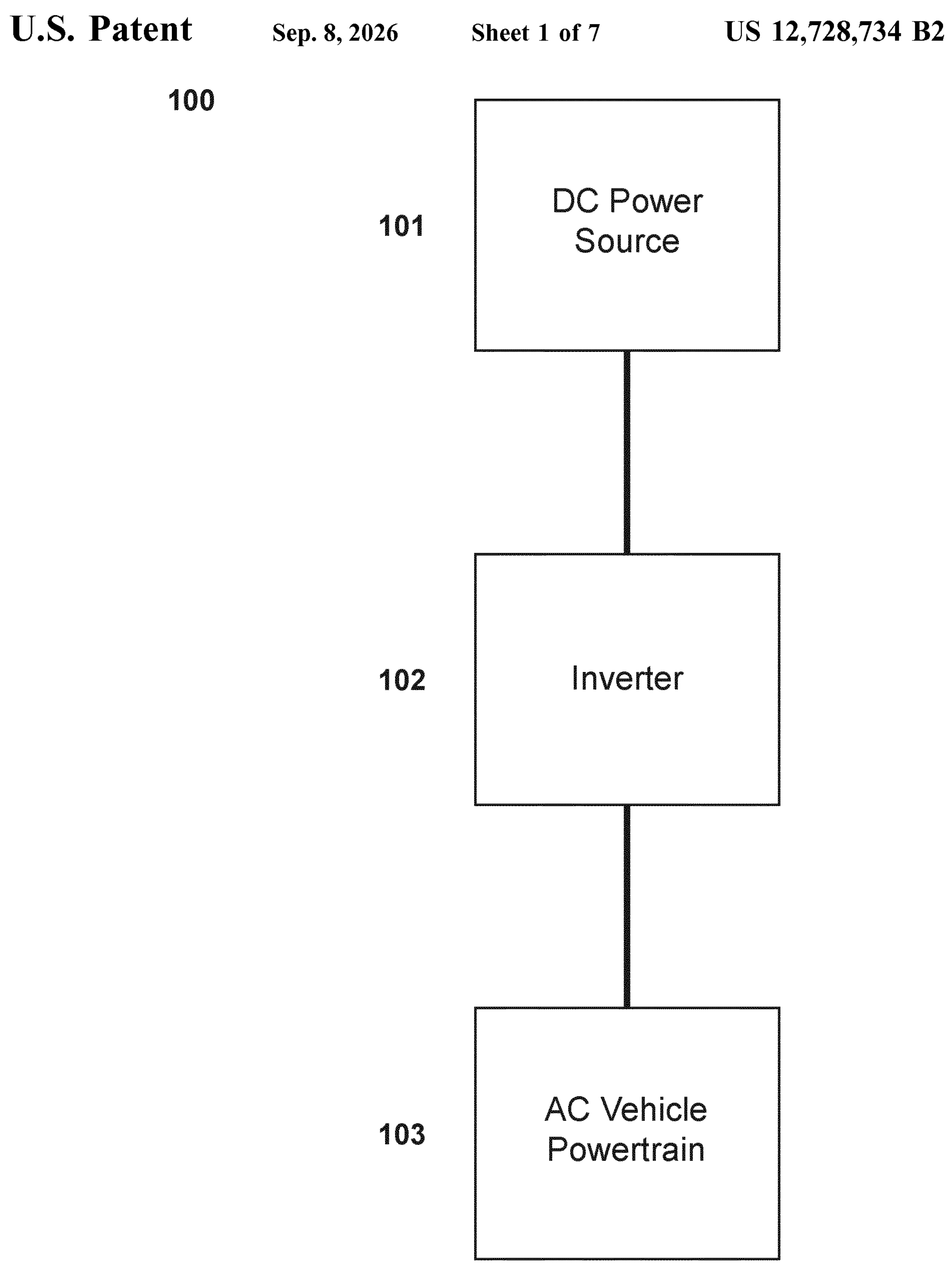
FIG. 1 schematically depicts an example of an electrically powered vehicle according to the present disclosure where a vehicle inverter system is interconnected to an electrical power supply and a vehicle powertrain.

FIG. 1 schematically depicts an example of an electrically powered vehicle 100 according to the present disclosure. The electrically powered vehicle comprises a vehicle inverter system 102 coupled to a direct current (DC) power source 101 and an alternating current (AC) vehicle powertrain 103.

In operation, the vehicle inverter system converts between DC and AC. The vehicle inverter has a power supply mode to convert DC to AC so as to power the AC vehicle powertrain. The vehicle inverter may also have a power generating mode to convert AC to DC for the storage of power in the power source.

The power source may be any suitable DC power supply mounted on the vehicle, including a replaceable DC battery, rechargeable DC battery or DC generator. The vehicle powertrain may comprise any suitable motor and drive to operate the vehicle or any accessory of the vehicle. The vehicle powertrain comprises a plurality of operating modes and the operation of the vehicle is dependent on the operating modes of the vehicle powertrain. The vehicle powertrain has an optimum torque for each operating mode.

The vehicle powertrain may, for example, comprise a traction motor and drive to rotate the wheels of the vehicle, where the rotation of the wheels varies according to the operating modes of the traction motor. Each operating mode of the vehicle powertrain generates a different type of vehicle motion (speed, acceleration, declaration, cruising etc.). The vehicle powertrain has an optimum torque for each operating mode.

The electrically powered vehicle may comprise a pure electric vehicle solely powered by electricity or a hybrid vehicle powered by electricity and at least one other fuel source. The electrically powered vehicle may comprise an automotive vehicle, rail vehicle, aerospace vehicle, a domestic vehicle, a commercial vehicle, a safety vehicle or any suitable electrically powered vehicle.

Figures 2A, 2B:
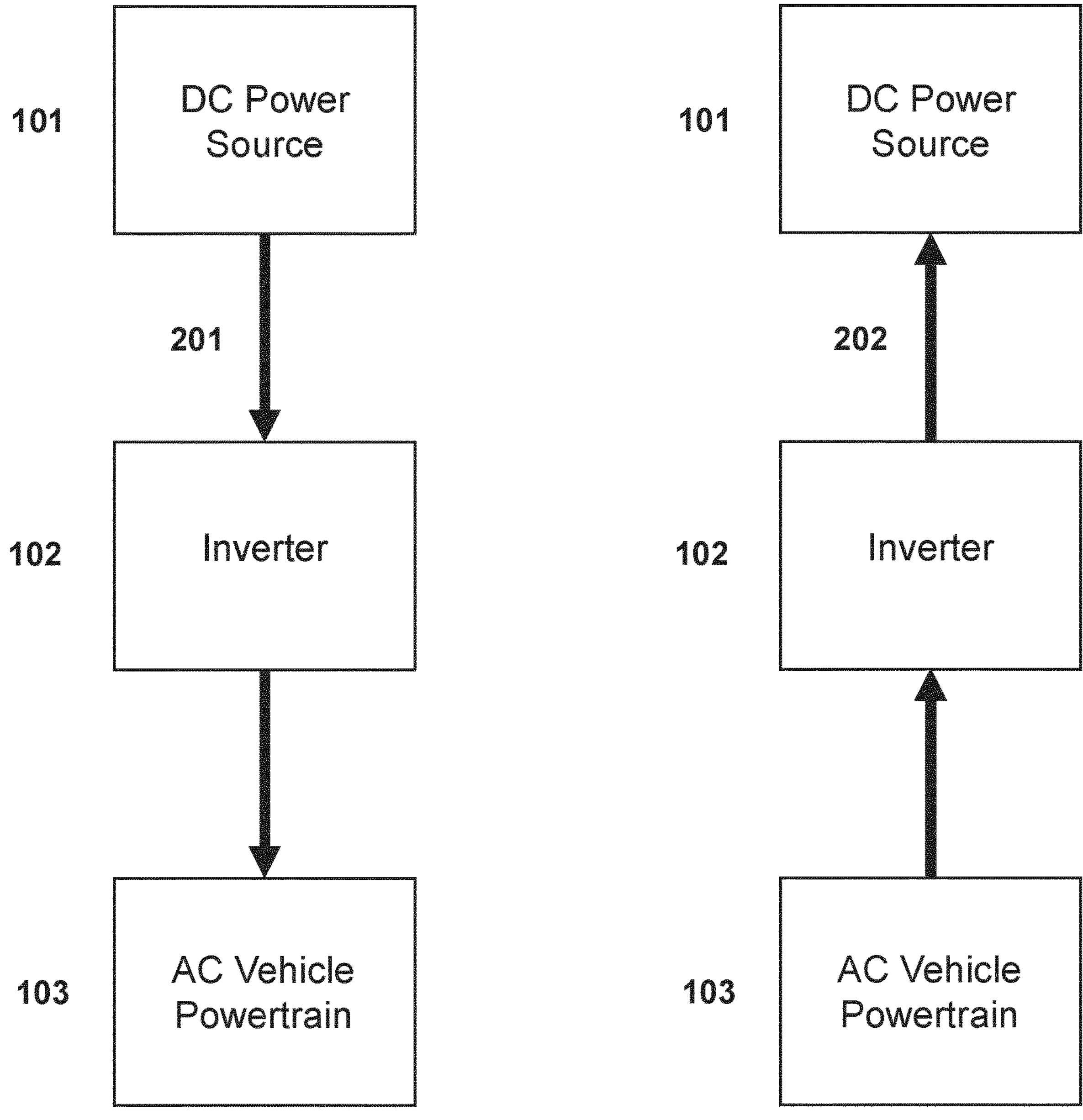
FIG. 2*a* schematically depicts the electrically powered vehicle of FIG. 1, where the inverter system is operating in power supply mode.
FIG. 2*b* schematically depicts the electrically powered vehicle of FIG. 1, where the vehicle inverter system is operating in power generating mode.

As shown in FIG. 2*a* the vehicle inverter system 102 may operate in a power-supply mode to power the AC vehicle powertrain 103. In the power-supply mode, the vehicle inverter receives DC from the DC power source 101, converts the DC to AC and supplies AC to power the vehicle powertrain.

As shown in FIG. 2*b*, the vehicle inverter system 102 may operate in a power-generating mode where the vehicle inverter acts as a rectifier, converting AC generated by the vehicle powertrain 103 to DC for the storage of power in the power source 101. For example, a traction motor of a vehicle powertrain may operate in reverse and generate AC as the vehicle is slowed during braking, and the vehicle inverter may convert the generated AC to DC for storage in a DC battery pack. This can be referred to as "regenerative braking".

Figure 3A:
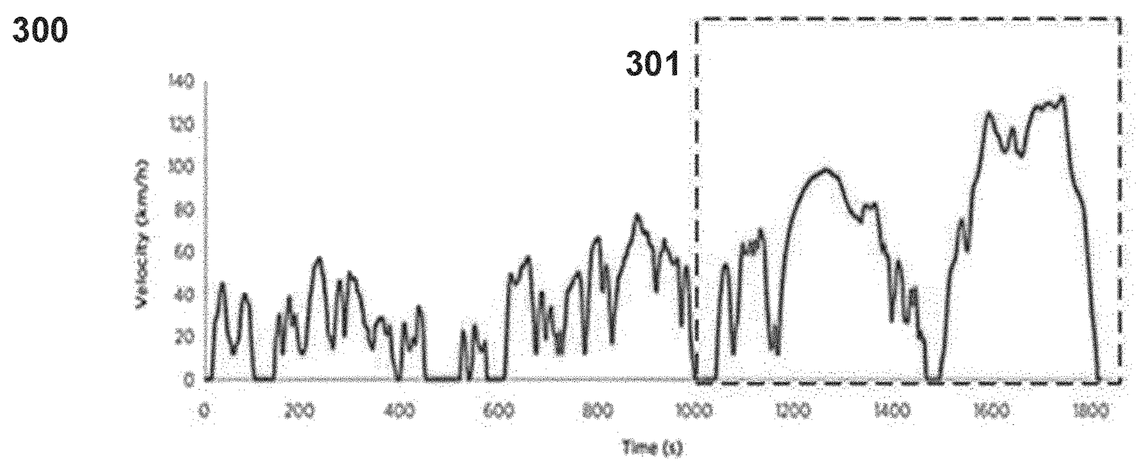
FIG. 3*a* depicts a speed/time graph of an example journey of the electrically powered vehicle of FIG. 1.
Figure 3B:
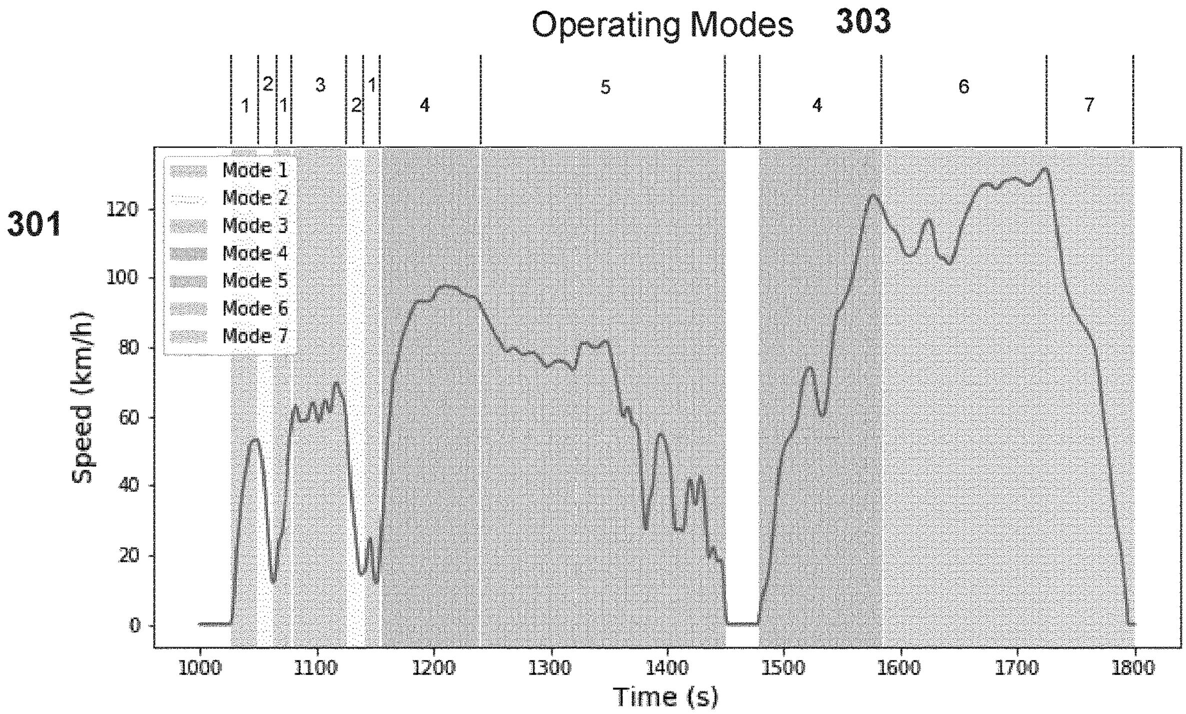
FIG. 3*b* depicts the speed/time graph during a selected segment of the example journey of the electrically powered vehicle of FIG. 3*a;*

FIGS. 3*a* and 3*b* relates to an example of an electrically powered vehicle where the vehicle powertrain comprises a traction motor to control the motion of the vehicle. FIG. 3*a* depicts a speed/time graph 300 of an example journey of the electrically powered vehicle 100 as driven by the vehicle powertrain. The gradient of the graph is indicative of the motion of the vehicle, for example the speed, acceleration, deceleration, cruising motion of the vehicle etc. In this example, the motion of the vehicle is determined by different operating modes of the vehicle powertrain, where each operating mode achieves a different type of vehicle motion. FIG. 3*b* depicts the speed/time graph 301 of the electrically powered vehicle during a selected segment of the journey. The selected segment is from 1000 s to 1800 s, as highlighted in the dotted box of FIG. 3*a*. The vehicle motion during the journey segment depicted in FIG. 3*b* is governed by 7 different operating modes of the vehicle powertrain 1 to 7. Table 1 lists the 7 different operating modes of the vehicle powertrain in this example.

TABLE 1

| Vehicle Motion | Operating Mode of Vehicle Powertrain |
|---|---|
| Low speed acceleration | Mode 1 |
| Low speed sliding | Mode 2 |
| Low speed cruise | Mode 3 |
| Continuous acceleration | Mode 4 |
| High speed braking | Mode 5 |
| High speed cruise | Mode 6 |
| Fast braking | Mode 7 |

Figure 4:
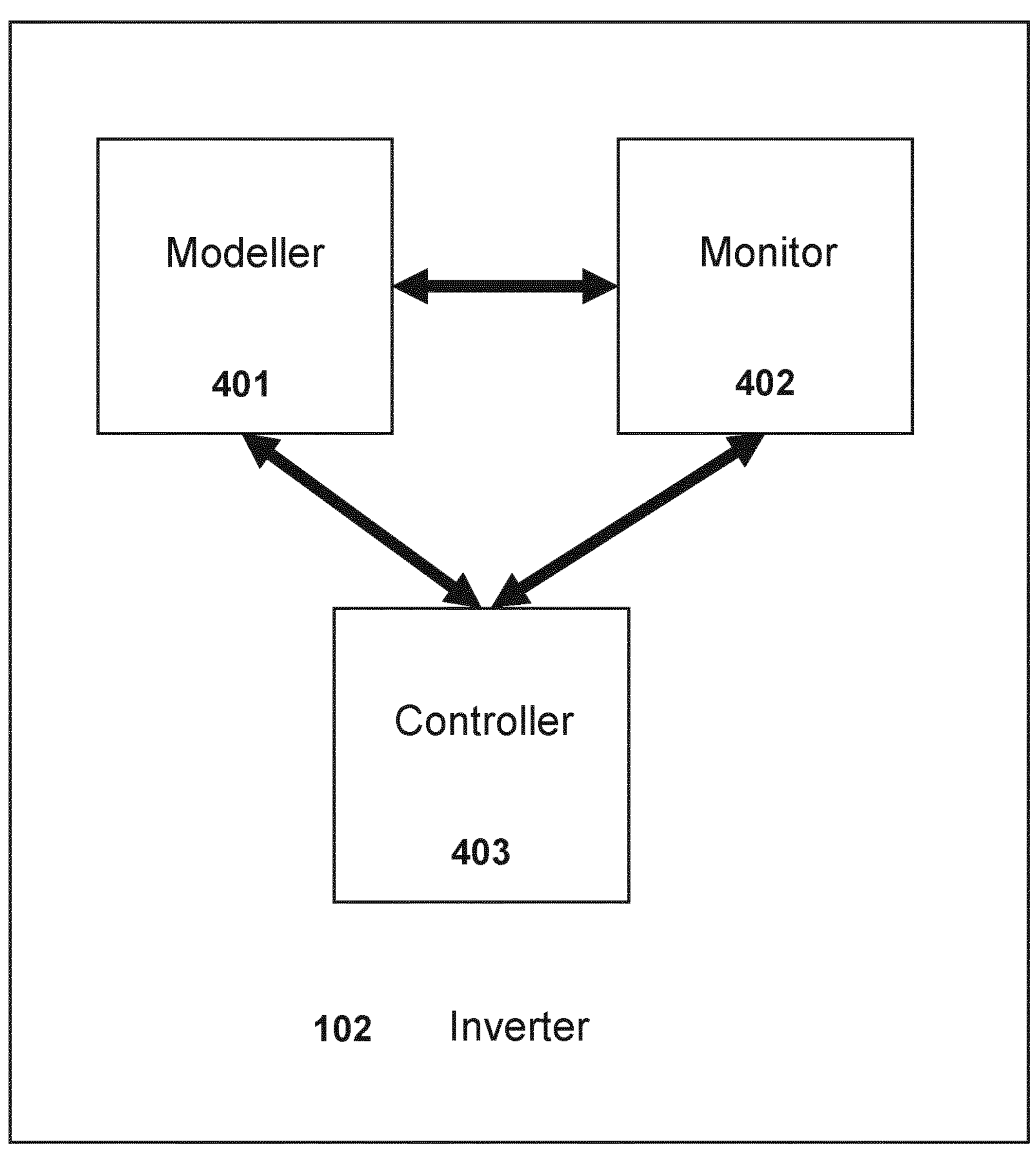
FIG. 4 schematically depicts an example of a vehicle inverter system according to the present disclosure of the electrically powered vehicle of FIG. 1.

As shown in FIG. 4, the vehicle inverter system comprises a modeller 401 comprising a classifying model that classifies power data of the vehicle inverter system according to the different operating modes of the vehicle powertrain, a monitor 402 to monitor power data of the vehicle inverter system controller, in real-time, whilst the vehicle powertrain is in operation in one of the operating modes, and a controller 403 to comparatively analyse the real-time power data of the vehicle inverter system with respect to the classifying model. Hence, during vehicle operation, the controller is able to identify the real-time operating mode of the vehicle powertrain from the real-time power data of the vehicle inverter system.

The classifying model may be pre-installed on the modeller prior to operation of the vehicle powertrain and vehicle inverter system. Alternatively the modeller may be configured to create the classifying model. The modeller may create the classifying model offline, when the vehicle is not in operation, and/or when the vehicle inverter and/or vehicle powertrain is in test mode. Alternatively or additionally, the modeller may create the classifying model online, when the vehicle is in operation. The classifying model is based on the power data of the vehicle inverter whilst the vehicle powertrain performs a plurality of pre-defined operating modes. In the example shown in FIG. 4, the modeller comprises a hardware-in-the-loop (HIL) simulator, suitable for creating a classifying model offline, to simulate the power data of the vehicle inverter as the vehicle powertrain is simulated to perform the pre-defined operating modes. The simulator may apply an exhaustive test procedure to ensure the vehicle inverter is tested for numerous operating modes relating to combinations of vehicle speeds and torques. The modeller comprises a splitter to divide the power data into a training and testing power data sets. A constructor constructs a plurality of clustering models and selects the classifying model with the highest F1 value.

The modeller may be configured to continue to update or refine the classifying model using vehicle inverter power data gathered in real-time whilst the vehicle is in operation so as to improve the accuracy of the classifying model.

Figure 5:
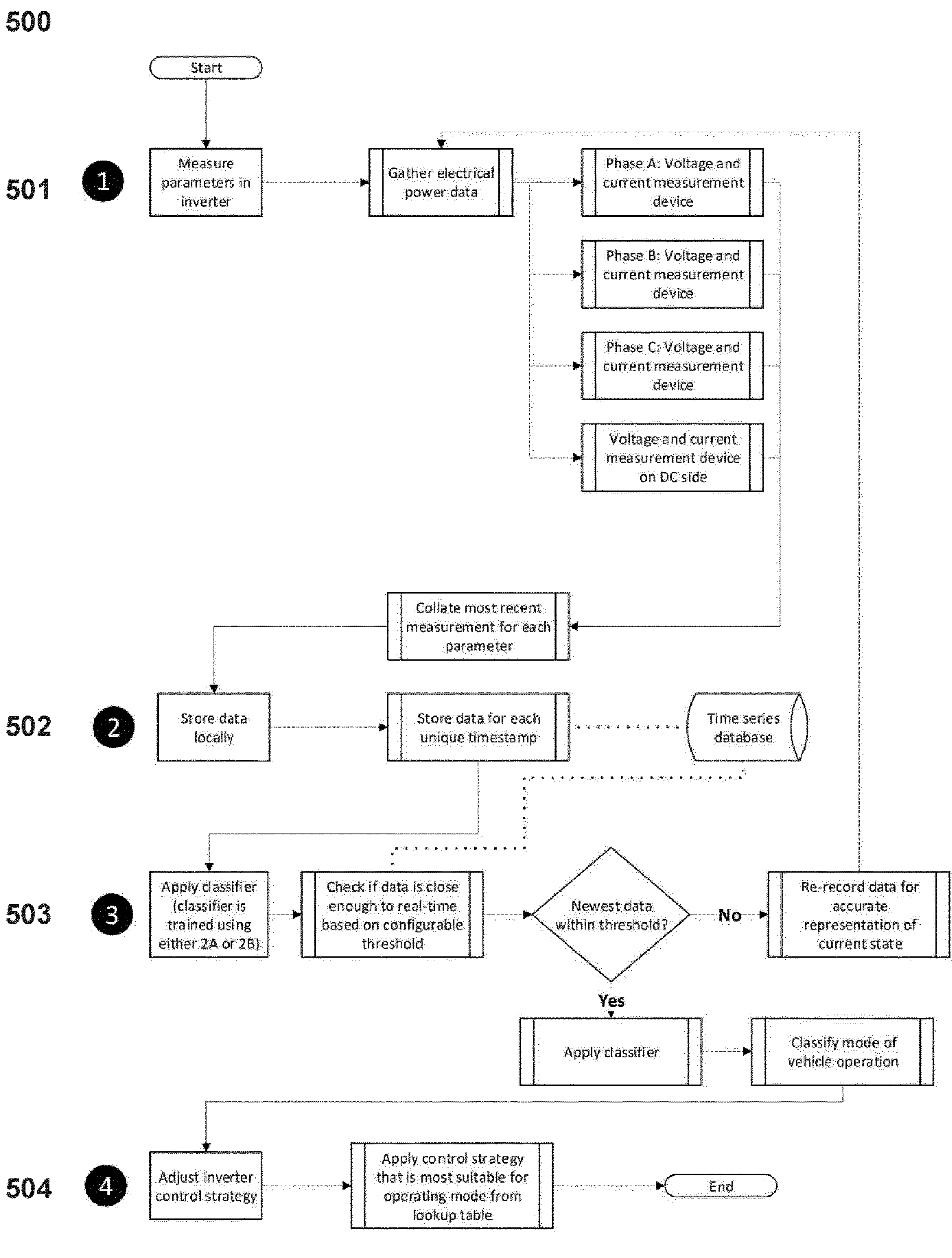
FIG. 5 illustrates an example method according to the present disclosure of identifying the real-time mode in which the vehicle powertrain is operating and adapting the AC output of the vehicle inverter according to the identified real-time mode.

FIG. 5 illustrates an example of a method 500 to infer the operating mode of a vehicle powertrain from power data of a vehicle inverter system and to adapt the AC output of the vehicle inverter system according to the inferred operating mode of the vehicle powertrain.

In a first stage 501 a monitor measures real-time data parameters of the vehicle inverter system as the vehicle powertrain is operating in an operating mode. Namely, the monitor measures the DC input data and AC output data at each phase. As indicated in the flow diagram 500, the monitor measures DC input current magnitude and DC input voltage magnitude. The monitor further measures AC output current and AC output voltage magnitude at Phase A, Phase B, and Phase C. The data measurements for the vehicle inverter are collated and measured as a function of time.

In a second stage 502 of the controlling method the collated power data is stored locally within a database of the vehicle inverter system. The stored power data has a measurement and an associated timestamp. Each timestamp is unique to the measurement (e.g. Phase A, Phase B, Phase C or DC) taken at that point in time. Power data measurements may be continuously or intermittently measured while the vehicle powertrain is in operation allowing for the power data to be updated prior to the comparative analysis with a classifying model. As explained below in relation to FIG. 7, the classifying model may be trained in real-time. The stored time series power data can be extracted from the database and used for refining or updating a classifying model, further enhancing the accuracy and reliability of the classifying model.

The step 503 of the example controlling method 500 as shown FIG. 5 is to apply the classifying model to identify the real-time operational mode of vehicle powertrain, and thus the requirements of the vehicle powertrain. The classifying model classifies power data of a vehicle inverter system according to different operating modes of the vehicle powertrain. Examples of modelling to generate a classifying model are explained in relation to FIGS. 6 and 7 below. The method is implemented by using a controller to comparatively analyse the power data of the vehicle inverter system with respect to the classifying model to identify the operating mode of the vehicle powertrain at that time. The controller compares the most recent measurement for each power data parameter of the vehicle inverter system, as required by the classifying model, checking that the timestamps of the most recent data is within a predefined threshold for temporal closeness. The predefined threshold can be varied depending on the application and the relative real-time computation required. If the measured power data is not within the predefined threshold then the power data needs to be re-recorded in order to obtain an accurate representation of the current state of the inverter system. This requires going back to the first stage 501, as shown in FIG. 5, and repeating the data measurements of the vehicle inverter system. When the measured power data falls within the predefined temporal threshold the controller analyses the measured power data with respect to the classifying model to determine the real-time operational mode of the powertrain.

In the final step 504 of the controlling method 500, once the real-time operational mode of the powertrain is identified 503, the operation of the vehicle inverter system may be adaptively controlled to adjust the AC output of the vehicle inverter system according to the identified operational mode of the powertrain. The vehicle inverter system may vary the AC output supplied to the vehicle powertrain to achieve desired speed and torque requirements of the identified operating mode of the vehicle powertrain. For example, the vehicle powertrain has an optimum torque for each operating mode. Hence, when the operating mode of the vehicle powertrain is identified, the vehicle inverter system may be adaptively controlled to supply an AC output to the vehicle powertrain to operate the vehicle powertrain at the optimum torque for the identified operating mode.

Adaptively controlling the operation of the vehicle inverter system according to each of the operating modes of the vehicle powertrain improves the performance of the vehicle powertrain, the vehicle inverter system and power source. For example, by operating the vehicle powertrain at its optimum torque for each operating mode, the performance of the vehicle powertrain is enhanced. Consequentially, the efficiency of the vehicle inverter system is improved and losses are reduced. The life-span of the power source is also optimised.

By utilizing operational vehicle inverter system power data to identify the real-time mode in which the powertrain is operating, and not requiring external data, the vehicle inverter system is a closed loop adaptive control system.

As shown in FIG. 4, the controller 403 is configured to operate the vehicle inverter system using a pre-defined control strategy according to each of the operating modes of the vehicle powertrain. The pre-defined control strategies control the operation of the vehicle inverter system to supply a pre-defined AC output to the vehicle powertrain according to the operating modes of the vehicle powertrain. Each pre-defined AC output powers the vehicle powertrain to operate at the optimum torque for each respective operating mode of the vehicle powertrain.

The pre-defined control strategies are dependent on the vehicle inverter system, the vehicle powertrain, the operating modes of the vehicle powertrain and the optimum torque for each operating mode of the vehicle powertrain. By way of example, the pre-defined control strategies may comprise a field orientated control (FOC) strategy, a digital pulse width modulation (DPWM) strategy, a deadbeat direct torque and flux control (DB-DTFC) strategy, a space vector pulse width modulation (SVPWM) strategy or a combination thereof.

Figure 6:
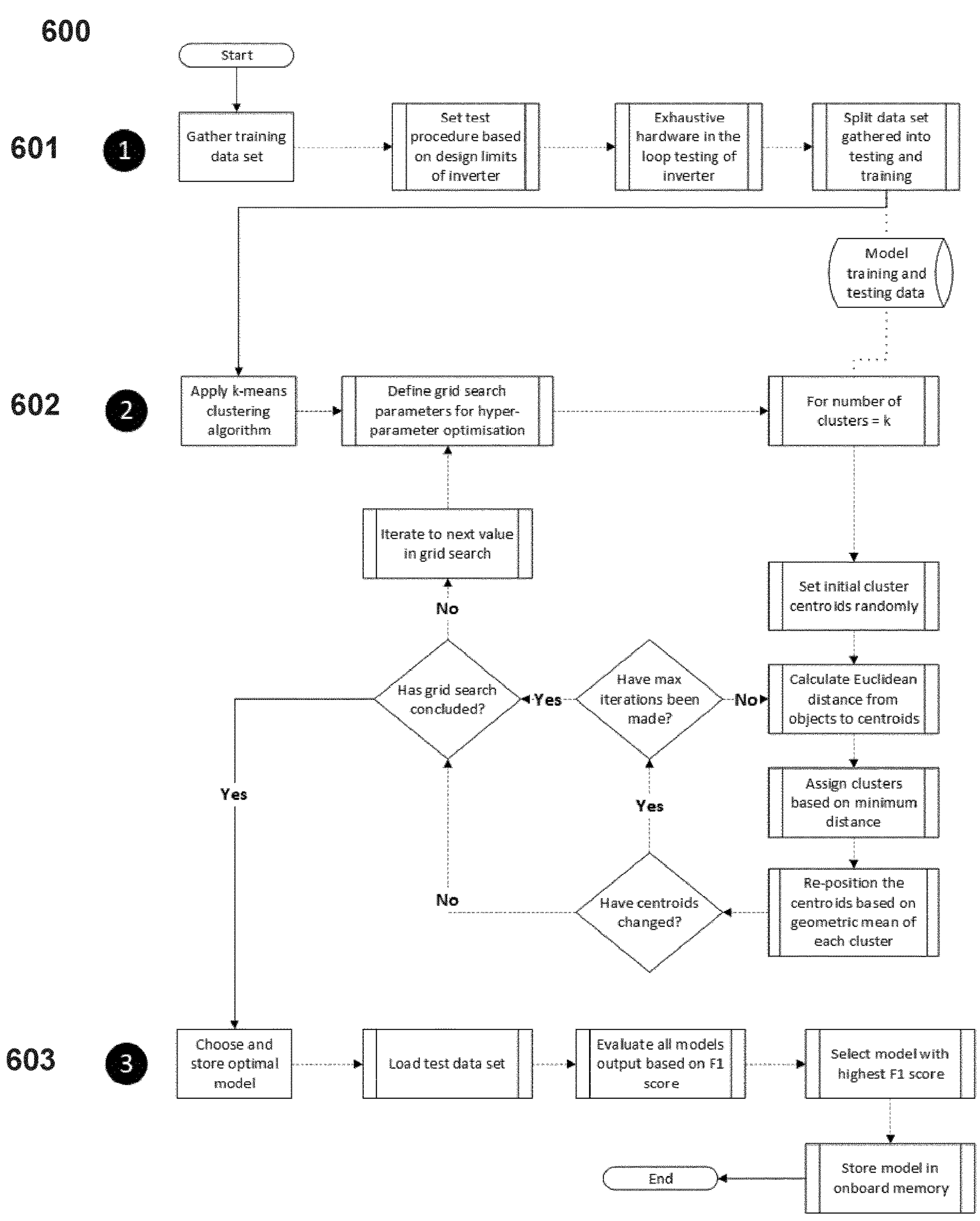
FIG. 6 illustrates an example offline modelling process, according to the present disclosure, to create a classifying model that classifies vehicle inverter power data according to the operating modes of the vehicle powertrain.

FIG. 6 illustrates an example of a modelling method 600 for developing a classifying model that classifies vehicle inverter system power data according to different operating modes of the vehicle powertrain.

In this example depicted in FIG. 6, the classifying model is created "offline", during a "test mode", when the vehicle inverter system and/or vehicle powertrain are not operating in real-time to drive the electrically powered vehicle. The classifying model created offline may optionally be further refined after it has been initially constructed and/or as it is utilised by the vehicle inverter system.

The classifying model is dependent on the electric vehicle, vehicle powertrain, the desired motion of the electric vehicle and the vehicle inverter system.

In a first stage 601 of the modelling process, operational data of the vehicle inverter system is gathered whilst a vehicle powertrain is operating in a known operational mode. The vehicle inverter system operational data may be gathered during the testing phase of the vehicle inverter system and/or vehicle powertrain in a vehicle. The operational data may be gathered using a monitor. The operational data may comprise power data of the vehicle inverter system, including DC input data and AC output data of the vehicle inverter system as the vehicle powertrain is operating in the different known operational modes. The DC input data may include DC input current magnitude data and DC input voltage magnitude data. The AC output data may include AC output current magnitude data and AC output voltage magnitude data, and for each phase. Other power data may be gathered for analysing the vehicle inverter system and characteristics. The gathered operational data may be stored in a database.

The operational data of the vehicle inverter system may be gathered using a hardware-in-the-loop (HIL) technique, wherein the HIL technique allows for the development and test of complex real-time embedded systems. The HIL technique provides a mathematical representation of the dynamic processes involved within the vehicle inverter system.

In this example, an exhaustive test process is defined using the HIL technique where the known operating mode of the vehicle powertrain generates a particular type of motion in the electric vehicle (e.g. speed, acceleration, deceleration, cruising etc.). The vehicle powertrain has an optimum torque for the known operational mode.

As part of the gathering process, the gathered operational data is divided using a splitter into a training data set and a testing data set. The division of the data set is based on a user defined split ratio, for example 80% training, 20% testing. Other split ratios can be used depending on the testing procedure and vehicle inverter system application. The training and testing data sets are stored in a database.

In a second stage 602, a k-means clustering technique is applied to the training data set to generate a plurality of classifying models relating to the known operational mode of the vehicle powertrain. The application of the k-means clustering technique is a known method of vector quantization. The training data is partitioned or clustered using a grid search approach to develop a number of classifying models, each with varying hyper-parameters (k). The grid search approach allows the values of the classifying models to be determined based on the tuning of the hyper-parameter (k). The hyper-parameter (k) defines the number of centroids within the data, i.e. the number of clusters to be produced within the technique. The technique iteratively fits the training data to each combination of hyper-parameters. A maximum number of iterations are deemed to be reached when the centroid fails to change between iterations. The maximum number of iterations can be manually set before the model commences.

Following the defining of the grid search parameters for hyper-parameter optimisation, the number of clusters (k) is set before the modelling begins. The initial cluster centroids are randomly set within the data set spread. The initial randomly assigned centroids are used as a starting point for determining the mean value(s) of the set(s) of data. The Euclidean distance from the centroid to the objects or observations within the data space are calculated. The clusters are then assigned based on the minimum distance calculated, i.e. the data space is partitioned into cluster cells. Once clustered into cells, the centroids are then re-positioned (reset) based on the geometric mean within each cluster. If the centroids have changed from the initial starting point, i.e. moved within the data space, then the step is repeated iteratively until the maximum number of iterations have been reached or the centroid no longer changes. The technique then progresses to the next value in the grid search, and the hyper-parameter optimisation process re-iterates. The process of finding the cluster centroids is again performed iteratively with the new hyper-parameter values. The whole process is repeated until the grid search has concluded.

The third stage 603 of the modelling process is to select an optimal classifying model for the known operating mode of the vehicle powertrain. The selection process includes using the test data to test the plurality of classifying models generated using the k-means clustering technique. Following testing, an optimal classifying model is chosen.

As part of the testing process, test data is loaded into each of the plurality of classifying models generated using the k-means clustering technique. The test outputs from each model are evaluated based on an optimisation score, for example an F1 score. The F1 score indicates the accuracy of each model when the test data is applied. An F1 value of 1 provides a perfect score of balancing precision and recall. The model with the highest F1 score, i.e. closest to a value of 1, is selected as the optimal classifying model for the known operating mode of the vehicle powertrain and then stored in a database.

The modelling process may be repeated for a plurality of known operating modes of the vehicle powertrain so as to create an optimal classifying model for each known operating mode.

The optimal classifying models for the different known operating modes of the vehicle powertrain may be collated to create a cumulative optimal classifying model. The cumulative optimal classifying model classifies the power data of the vehicle inverter system according to the plurality of known operating modes of the vehicle powertrain.

Having constructed a classifying model offline, the classifying model can be utilised in real-time by a vehicle inverter system to identify an operational mode of the vehicle powertrain by comparing real-time operational data of the vehicle inverter system to the classifying model.

Figure 7:
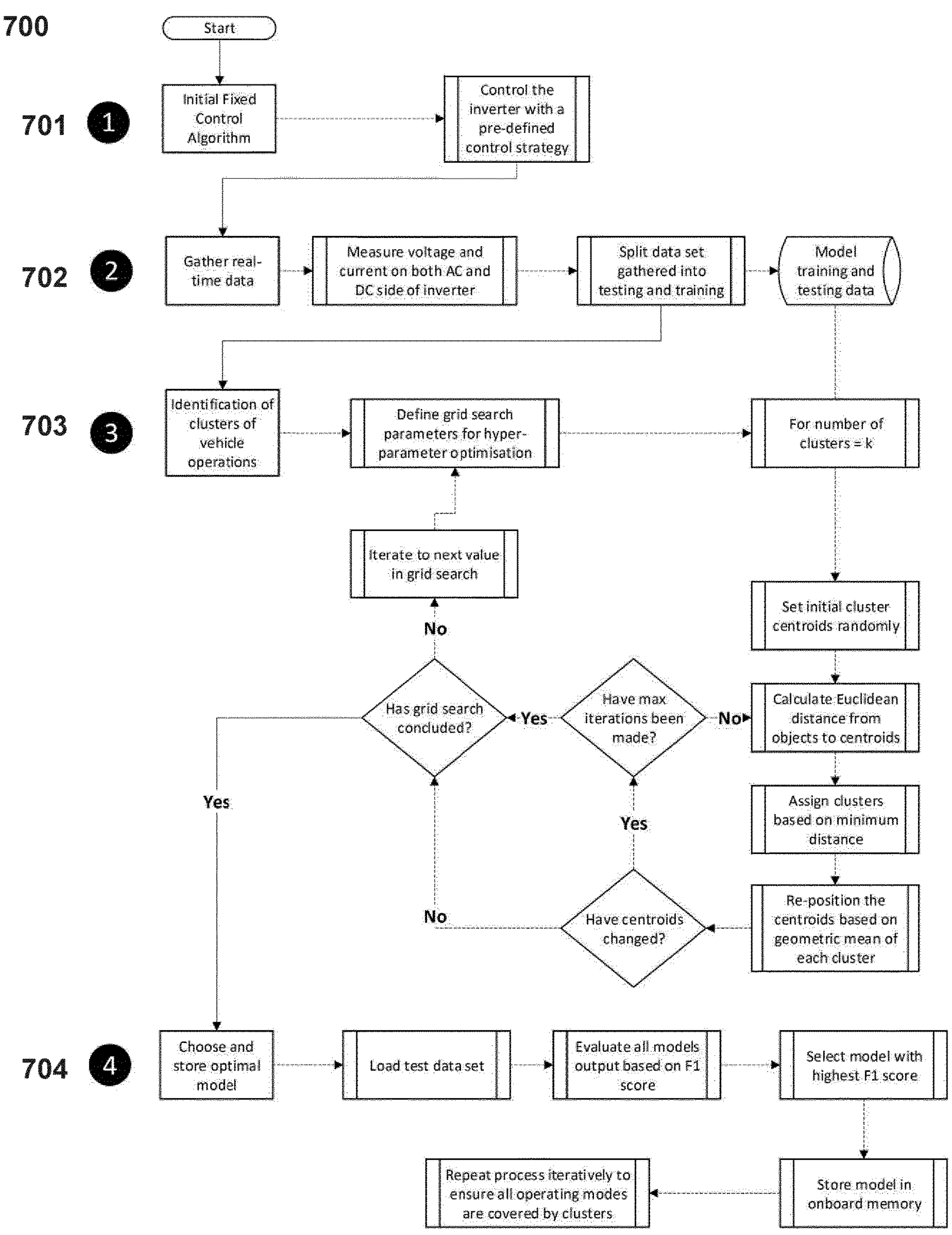
FIG. 7 illustrates an example online modelling process, according to the present disclosure, to create a classifying model that classifies vehicle inverter power data according to the operating modes of the vehicle powertrain.

FIG. 7 illustrates an alternative example of a modelling method 700 of the present disclosure, where the modelling method creates a classifying model that classifies vehicle inverter system power data according to different operating modes of the vehicle powertrain.

In this example depicted in FIG. 7, the classifying model is developed "online" or in "real-time" while the vehicle powertrain is operating to drive the electrically powered vehicle. The modelling process uses real time vehicle inverter system data to train the classifying model in real-time as the vehicle inverter system and vehicle powertrain are operational, to drive the electric vehicle.

In a first stage 701 of the modelling process, the operation of the vehicle inverter system is initially controlled by a pre-defined initial control strategy. The pre-defined control strategy defines the initial power output of the vehicle inverter system. For example, the vehicle inverter system may be initially operated by an initial field orientated control (FOC) strategy.

Having initially defined and fixed the power output of the vehicle inverter system, the second stage 702 of the modelling process is to gather real-time power data of the vehicle inverter system as the vehicle powertrain operates in a known operational mode in real-time. The real-time power data may comprise DC input power data and AC output power data. For example, the DC input data may include DC input current magnitude data and DC input voltage magnitude data. The AC output data may include AC output current magnitude data and AC output voltage magnitude data, and for each phase. The gathered real-time data may be stored in a database locally within the vehicle inverter system and divided into a training data set and testing data set.

In the third stage 703 a k-means clustering technique is applied to the training data. Once the clusters have been identified, the third stage 703 of the real-time classification process follows similarly to that of stage two of the offline modelling process to generate a plurality of classifying models relating to the known real-time operational mode of the vehicle powertrain.

Namely, the training data is partitioned or clustered using a grid search approach to develop a number of classifying models, each with varying hyper-parameters (k). The grid search approach allows the optimal values of the classifying model to be determined based on the tuning of the hyper-parameter (k). The hyper-parameter (k) defines the number of centroids within the data, i.e. the number of clusters to be produced within the technique. The technique iteratively fits the training data to each combination of hyper-parameters. A maximum number of iterations are deemed to be reached when the centroid fails to change between iterations. As this is real-time classification, the maximum number of iterations within the technique cannot be manually set before the model commences, therefore it relies on the minimum change in centroid. Thus, the hyper-parameter (k) value is not restricted and may be any value between 1 and 10, with the online classifying model trained for every combination of hyper-parameter (k) until a hyper-parameter (k) value with the least error is determined.

Following defining the grid search parameters for hyper-parameter optimisation, the initial cluster centroids are randomly set within the data set spread. The initial randomly assigned centroids are used as a starting point for determining the mean value(s) of the set(s) of data. The Euclidean distance from the centroid to the objects or observations within the data space are calculated. The clusters are then assigned based on the minimum distance calculated, i.e. the data space is partitioned into cluster cells. Once clustered into cells, the centroids are then re-positioned (reset) based on the geometric mean within each cluster. If the centroids have changed from the initial starting point, i.e. moved within the data space, then the step is repeated iteratively until the maximum number of iterations have been reached or the centroid no longer changes. The algorithm then progresses to the next value in the grid search, and the hyper-parameter optimisation process re-iterates. The process of finding the cluster centroids is again performed iteratively with the new hyper-parameter values. The whole process is repeated until the grid search has concluded.

The fourth stage 704 of the modelling process is to select an optimal model for the known operating mode of the vehicle powertrain. The selection is made using the test data to test the plurality of classifying models generated using the k-means clustering technique. Following testing, an optimal classifying model is chosen and stored in a database.

As part of the testing process, test data is applied to each of the plurality of classifying models generated using the k-means clustering technique. The test outputs from each model are evaluated based on an optimisation score, for example F1.

The real-time modelling stages 701 to 704 of the flow diagram are repeated iteratively to create an optimal classifying model for multiple, preferably all the, operating modes of the vehicle powertrain. A different pre-defined control strategy may be chosen as a starting point, and the process repeats.

The optimal real-time classifying models for each of the different known operating modes of the vehicle powertrain may be collated to create a cumulative optimal classifying model. The cumulative optimal classifying model classifies the real-time power data of the vehicle inverter system according to the plurality of known operating modes of the vehicle powertrain.

The modelling process can be utilised whilst a vehicle powertrain is operating in real-time to update and/or refine a prior classifying model.

Thus, the classifying model can be utilised by the vehicle inverter system to identify an operational mode of the vehicle powertrain.

The invention claimed is:

1. A method to adaptively control a vehicle inverter system that is operable to power a vehicle powertrain, wherein the vehicle powertrain comprises a plurality of operating modes, each operating mode achieving a different type of vehicle motion such that vehicle motion during a journey is governed by different operating modes, each operating mode being associated with a predetermined optimum torque, the method comprising:

identifying a real-time operating mode of the vehicle powertrain, wherein the real-time operating mode is one of the plurality of operating modes of the vehicle powertrain; and adaptively controlling an AC power output of the vehicle inverter system for the vehicle powertrain according to the real-time operating mode of the vehicle powertrain such that the vehicle powertrain operates with the predetermined optimum torque according to the real-time operating mode.

2. The method of claim 1, wherein identifying the real-time operating mode comprises:

monitoring real-time power data of the vehicle inverter system as the vehicle powertrain operates in the real-time operating mode; and determining the real-time operating mode of the vehicle powertrain by comparatively analysing the real-time power data of the vehicle inverter system with respect to a classifying model.

3. The method of claim 2, wherein monitoring the real-time power data of the vehicle inverter system comprises:

monitoring real-time DC input power data of the vehicle inverter system; and monitoring real-time AC output power data in each phase of the vehicle inverter system.

4. The method of claim 3, wherein monitoring real-time DC input power data comprises monitoring real-time DC input current and DC input voltage; and wherein monitoring real-time AD output power data comprises monitoring real-time AC output current and AC output voltage, at each phase.

5. A system to adaptively control a vehicle inverter system that is operable to power a vehicle powertrain, wherein the vehicle powertrain has a plurality of operating modes, each operating mode achieving a different type of vehicle motion such that vehicle motion during a journey is governed by different operating modes, each operating mode being associated with a predetermined optimum torque, the system comprising:

a controller configured to:

identify a real-time operating mode of the vehicle powertrain, wherein the real-time operating mode is one of the plurality of operating modes of the plurality of operating modes, and adaptively control an AC power output of the vehicle inverter system such that the vehicle powertrain operates with the predetermined optimum torque according to the real-time operating mode of the vehicle powertrain.

6. The system according to claim 5, further comprising:

a monitor configured to gather real-time power data of the vehicle inverter system as the vehicle powertrain operates in the real-time operating mode; and a classifying model configured to model power data of the vehicle inverter system in relation to the plurality of operating modes of the vehicle powertrain;

wherein the controller is configured to comparatively analyse the gathered real-time power date of the vehicle inverter system with respect to the classifying model to identify the real-time operating mode of the vehicle powertrain.

7. The system according to claim 6, wherein the monitor is configured to monitor real-time DC input power data and real-time AC output power data in each phase of the vehicle inverter system.

8. The system according to claim 7, wherein real-time DC input power data comprises real-time DC input current and DC input voltage; and wherein the real-time AD output power data comprises real-time AC output current and AC output voltage, at each phase.

9. The system according to claim 6, wherein the classifying model comprises a predetermined classifying model and/or a real-time classifying model.

10. The method according to claim 1, further comprising switching between two of the operating modes during a journey of the vehicle.

11. The method according to claim 2, wherein the switching between two of the operating modes during the journey is carried out based on monitored real-time power data of the vehicle inverter system.

* * * * *